United States Patent [19]

Milde, Jr.

[11] Patent Number: 4,843,370

[45] Date of Patent: Jun. 27, 1989

[54] INTELLIGENT, AUTOMATIC HAZARD LIGHT FOR A MOTOR VEHICLE

[75] Inventor: Karl F. Milde, Jr., Mahopac, N.Y.

[73] Assignee: V-Tronics Corporation, Mahopac, N.Y.

[21] Appl. No.: 122,189

[22] Filed: Nov. 18, 1987

[51] Int. Cl.⁴ .............................................. B60Q 1/00
[52] U.S. Cl. .................................... 340/466; 340/471; 307/10.8
[58] Field of Search ............... 340/72, 52 F, 104, 903; 307/10 LS

[56] References Cited

U.S. PATENT DOCUMENTS 3,771,122  11/1973  Sattler ................................ 340/75 X
4,357,594  11/1982  Ehrlich et al. ......................... 340/72

FOREIGN PATENT DOCUMENTS

2714434  10/1977  Fed. Rep. of Germany ...... 340/903

Primary Examiner—Joseph A. Orsino
Assistant Examiner—Jeffery A. Hofsass

[57] ABSTRACT

Intelligent electronic circuit apparatus is disclosed for automatically controlling the hazard warning system (such as a tail light) of a motor vehicle so as to assist in preventing accidents. The apparatus includes a switch for selectively connecting the tail light with a voltage source and a control device for automatically closing the switch, thereby connecting the tail light to the voltage source, in response to a condition indicating a hazard to other vehicles in the vicinity. The invention provides means for sensing the driving environment of the motor vehicle and for changing the condition of response in dependence upon the sensed environment.

20 Claims, 7 Drawing Sheets

INTELLIGENT, AUTOMATIC HAZARD LIGHT FOR A MOTOR VEHICLE

CROSS-REFERENCE TO RELATED APPLICATION

This application for patent is related by way of common inventorship, ownership and subject matter to the U.S. patent application Ser. No. 07/083,042, filed Aug. 10, 1987, for "Automatic Hazard Light for a Motor Vehicle," which application is incorporated herein by reference.

BACKGROUND OF THE INVENTION

The present invention relates to the field of motor vehicles and, more particularly, to a device for automatically controlling a tail light on a motor vehicle so as to avoid motor vehicle accidents.

A device or system for automatically switching on the hazard lights of a motor vehicle is known from the above-referenced patent application Ser. No. 07/083,042. This device switches on a warning tail light of the motor vehicle (e.g., the hazard lights) upon sensing substantially the same conditions as would lead the vehicle operator to manually switch on the hazard lights; in particular:

(1) when the motor vehicle speed (instantaneous or average speed) falls below a prescribed threshold speed for a prescribed period of time;

(2) when the instantaneous motor vehicle speed falls below the time average vehicle speed by a prescribed amount for a prescribed period of time;

(3) when the closure speed between the motor vehicle and another motor vehicle, either in front or in the rear, exceeds a prescribed value;

(4) when the distance between the motor vehicle and another motor vehicle, either in front or in the rear, falls below a prescribed value;

(5) when one road wheel of the motor vehicle does not rotate at substantially the same speed as another road wheel or other road wheels of the vehicle (thus indicating wheel spinning, skidding or brake lock); and/or (6) when the motor vehicle is mechanically disabled for any reason (e.g., is out of fuel or has a flat tire).

This device normally will simply switch on the conventional flashing hazard lights of the motor vehicle in response to one or more of the above conditions. However, it is important that the device does not switch on the hazard lights in situations where they are not needed, since frequent, unnecessary flashing of hazard lights would cause confusion to other motor vehicle operators. For example, it is clearly not necessary (and, indeed it is undesirable) to flash hazard lights in the stop-and-go city traffic environment.

It is therefore an objective to provide a device or system for automatically controlling the hazard lights of a motor vehicle which avoids and eliminates the problem that the hazard lights may be unnecessarily or undesirably switched on.

SUMMARY OF THE INVENTION

The above-mentioned objective, as well as other objectives that will become apparent in the discussion that follows, are achieved, according to the present invention, by providing an intelligent hazard light control system which is capable of sensing and "adapting" to the particular driving environment of the motor vehicle.

In particular, in apparatus for automatically controlling the tail light of a motor vehicle, which comprises a switch for selectively connecting the tail light with a voltage source and a control device for automatically closing the switch, thereby connecting the tail light to the voltage source, in response to a condition indicating a hazard to other vehicles in the vicinity, the invention provides that the control device includes means for sensing the driving environment of the motor vehicle and for changing the condition of response in dependence upon the sensed environment.

For a full understanding of the present invention, reference should now be made to the following detailed description of the preferred embodiments of the invention and to the accompanying drawings.

BRIEF DESCRIPTION OF THE DRAWINGS

FIG. 1 (comprised of FIGS. 1A and 1B, arranged one above the other with FIG. 1A on top) is a block diagram of apparatus according to the invention for automatically controlling the tail light of a motor vehicle.

FIG. 2 (comprised of FIGS. 2A, 2B, 2C and 2D, arranged one above the other in the order, from top to bottom, of 2A, 2B, 2C and 2D) is a flow chart of a software program, according to the invention, for use with the apparatus of FIG. 1.

DESCRIPTION OF THE PREFERRED EMBODIMENTS

The preferred embodiments of the present invention will now be described with reference to FIGS. 1-4 of the drawings.

Figure 1A:
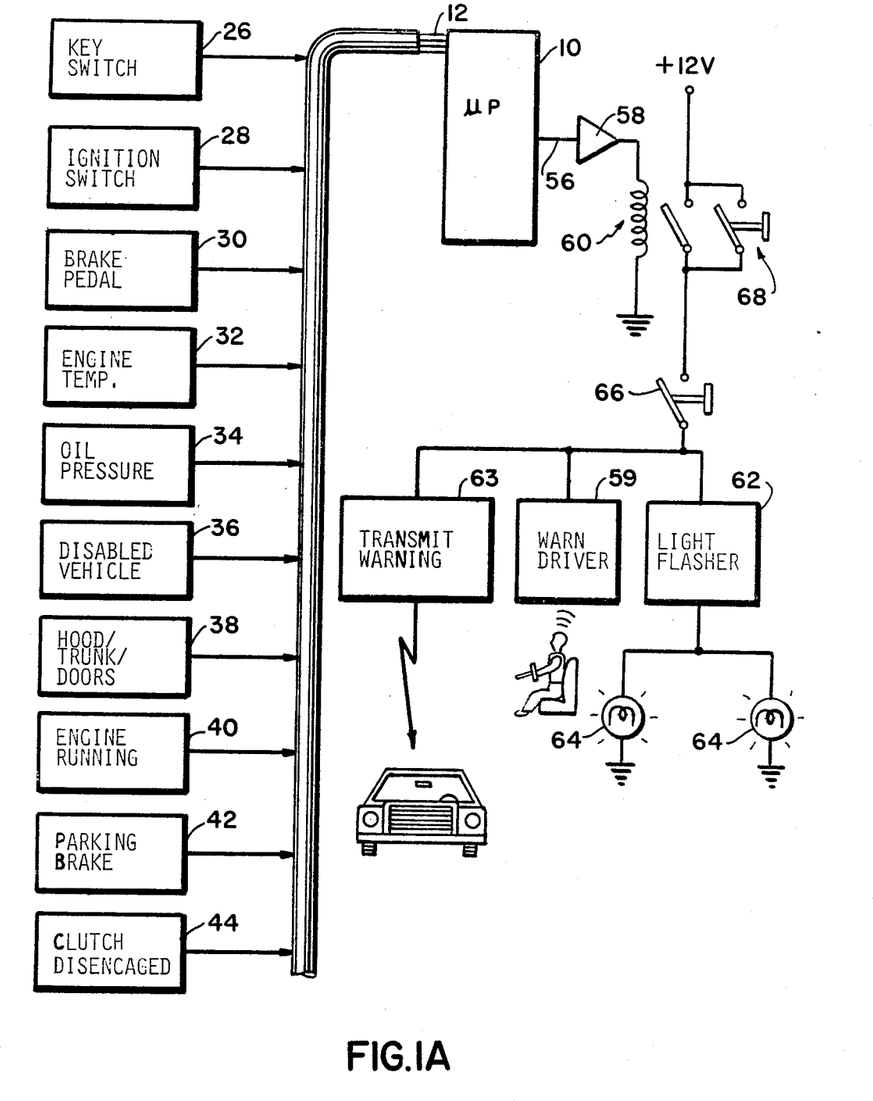
Figure 1B:
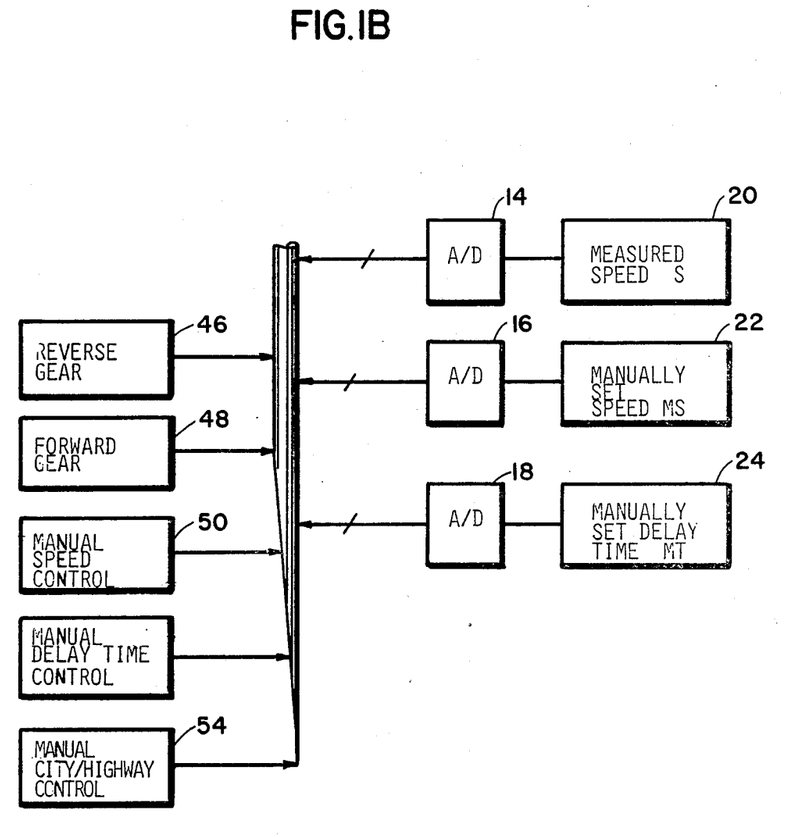
Figure 2A:
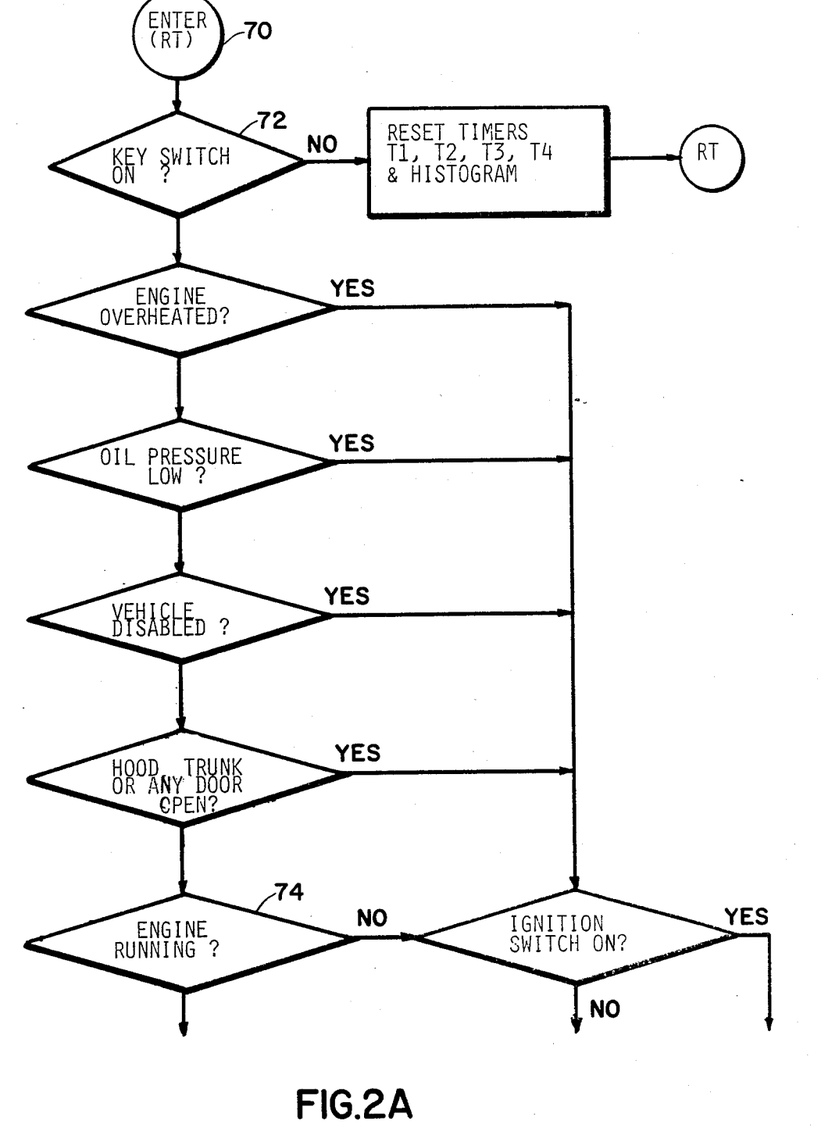
Figure 2B:
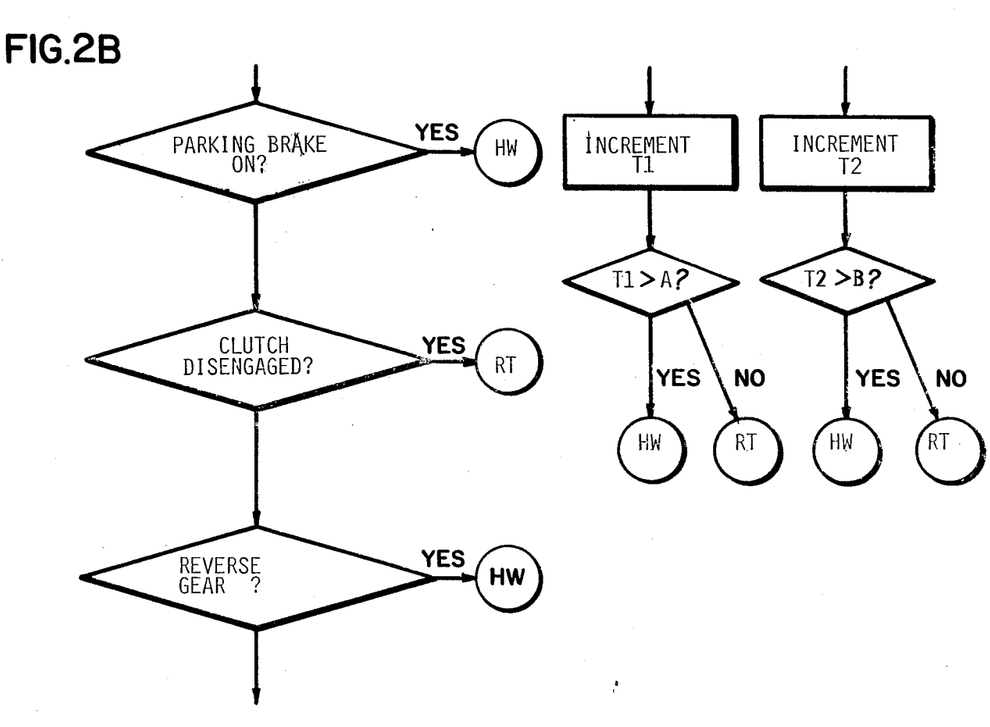
Figure 2C:
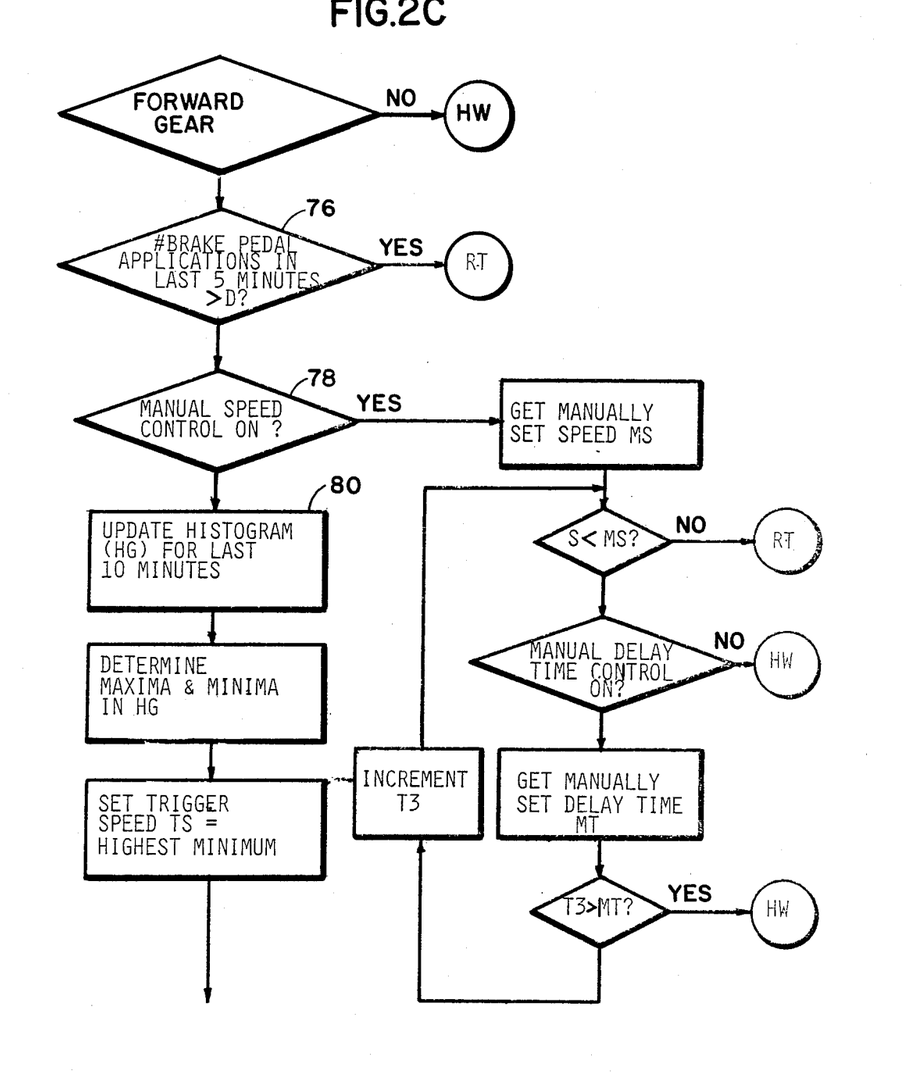
Figure 2D:
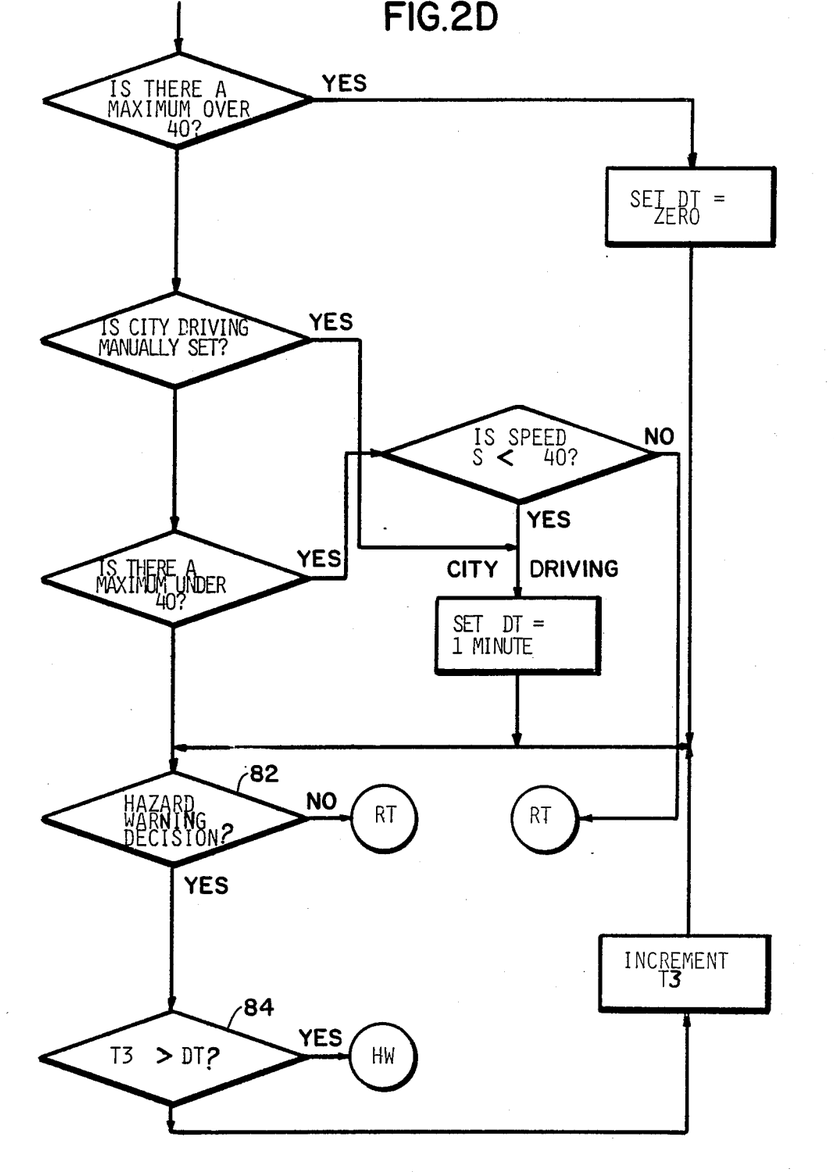

FIG. 1 illustrates a microprocessor controlled electronic system for controlling the tail light of a motor vehicle. This system includes a microprocessor 10 having a plurality of inputs 12. Connected to these inputs are three analog-to-digital converters 14, 16 and 18 which receive signals from three analog signal sources 20, 22 and 24, respectively. The signal source 20 indicates the actual measured speed of the motor vehicle. Signal sources 22 and 24 are manually adjustable potentiometers which permit manual entry of a threshold speed MS and a prescribed delay time MT, respectively.

Signal sources represented by the blocks 26-54 on the left side of FIG. 1 provide on/off (logical "1" or "0") signals to the microprocessor in dependence upon certain conditions or states of the motor vehicle. These conditions are:

Block 26: presence or absence of a key in the ignition switch;
Block 28: ignition switch on or off;
Block 30: brake pedal depressed or not;
Block 32: engine temperature exceeding, or not exceeding normal operating temperature;
Block 34: oil pressure normal or below normal;
Block 36: vehicle mechanically disabled in any other way (out of fuel, flat tire, etc.);
Block 38: vehicle hood, trunk and all doors are closed, or one of them is open;
Block 40: engine running or not running;
Block 42: parking brake on or off;
Block 44: clutch engaged or disengaged;

Block 46: transmission shifted into reverse or not;
Block 48: transmission shifted into a forward gear or not;
Block 50: manual speed control switched on or off;
Block 52: manual delay time control switched on or off; and
Block 54: manual city driving control switched on or off.

Figure 3:
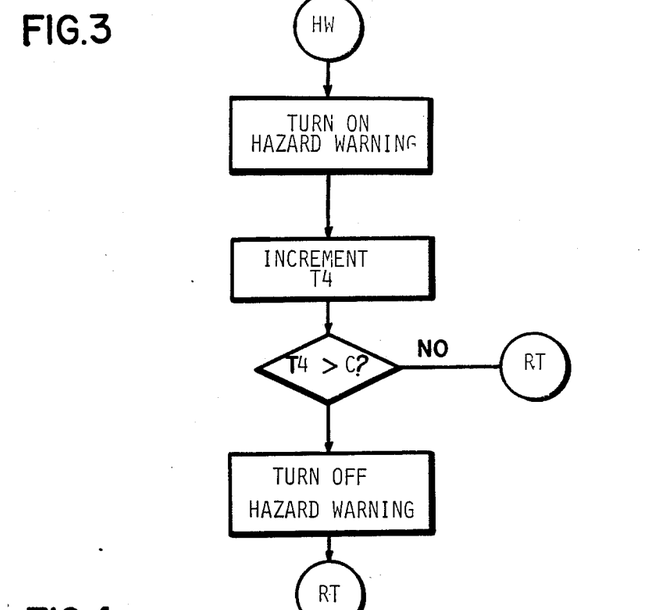
FIG. 3 is a flow chart of a brief subroutine called in the program of FIG. 2.

The microprocessor 10 receives these signals and operates according to the program represented in the flow charts of FIGS. 2, 3. This microprocessor thus provides "intelligence" and selectively produces an output on line 56 which automatically turns on the hazard warning system of the motor vehicle. More particularly, the signal on line 56 is amplified by means of an amplifier 58 and supplied to a relay 60 to close the circuit between the vehicle 12 volt battery and an electric flasher 62. The flasher 62 periodically interrupts the voltage supplied to the motor vehicle tail lights 64. If desired, or in the alternative, an audible or visible warning may be provided to the driver of the vehicle as indicated by device 59, and/or a warning signal may be transmitted to other vehicles in the vicinity as indicated by device 63.

The automatic hazard warning system may be disabled by a manual switch 66 or bypassed by a manual switch 68.

FIGS. 2 and 3 illustrate a software program which may be used with the microprocessor 10 to selectively activate and deactivate the relay 60 in dependence upon the instantaneous state of the motor vehicle as well as the driving environment in which it finds itself. It will be understood that this program is only exemplary, and many other similar programs will occur to those skilled in the art to accomplish substantially the same purposes and objectives.

Since the flow charts of FIGS. 2, and 3 are self-explanatory to a large extent, each of the various blocks in these charts will not be separately and individually described. However, some general commentary is desirable to set forth the objectives of the different sections of the program and to explain the exemplary techniques and methods used in the program to achieve these objectives.

The program is entered at block 70 and it immediately determines, in block 72, whether the ignition key of the motor vehicle is in the key slot (or an equivalent electronic key is on). If not, the timer variables T1, T2, T3 and T4 as well as the histogram used in the program are reset to zero and the program returns ("RT") to enter. If so, a number of parameters are tested to determine if the vehicle is in proper condition for operation.

The next major decision point is at block 74 which asks if the motor vehicle engine is running. If not, the program asks if the ignition switch has been turned on. If the operator has not turned the switch on (this being the reason that the engine is not running), a timer T1 is incremented for a relatively long period of time until it exceeds a preset threshold value A. After this time has elapsed, the microprocessor turns on the hazard warning system (flashes tail lights, warns driver, warns other drivers, etc.) as indicated by the letters "HW". If the engine is not running and the ignition switch is on, the engine may be disabled or the operator may have accidently left the key in the ignition with the switch on. In either case, a timer T2 is incremented for a relatively short period of time until it exceeds a present threshold value B. After this short period has elapsed the microprocessor turns on the hazard warning system.

An exemplary procedure for turning on the hazard warning system is shown in FIG. 3. As is illustrated there, a timer T4 is repeatedly incremented until either the conditions cease which resulted in turning on the warning system, or the timer exceeds a preset threshold value C. In the latter case the hazard warning is automatically extinguished, it being assumed that the vehicle by this time has been moved or towed away. The threshold value C is set appropriately high so that the timer T4 may run for an hour or two before hazard warning system is switched off.

If the motor vehicle engine has been determined to be running, the program tests some additional parameters and takes the appropriate action in response to the outcome. One such tests, which is indicated in block 76, deserves some explanation.

During the operation of the program, the microprocessor is responsive to an interrupt signal from the brake pedal switch 30 (FIG. 1) to update a count of the number (and/or length of time) of the actuations of the brake pedal by the vehicle operator during the preceding few minutes (e.g. 5 minutes). This value is then compared at block 76 to a preset threshold value D and, if this value is exceeded (indicating stop-and-go city driving), the program returns. If not, the program continues.

The program next tests to determine whether the vehicle operator has switched off the automatic "adaptive" speed control feature. If manual operation has been selected in block 78, the program reads in the manually selected speed MS from the potentiometer 22 and A/D converter 16. The actual measured speed S, read in from the sensor 20 and A/D converter 14, is then compared with the speed threshold MS and, if it exceeds this value, the program returns. If not, the program checks to determine whether the manual delay time switch has been turned on by the operator. If not, the hazard warning system is activated; if so, the program reads in the manually selected delay time MT from the potentiometer 24 and A/D converter 18 and compares the timer variable T3 with the threshold value MT. If the timer T3 has been incremented for a sufficiently long period of time so as to exceed the value MT, then the hazard warning system is activated. If not, the variable T3 is incremented and the program returns to the point where the speed S is compared with the threshold speed MS. In this way, if the speed S of the vehicle momentarily drops below the threshold speed MS, the hazard warning system will not be switched on unless the delay time threshold is set to zero (either manually or by switching off the manual delay time control).

Figure 4:
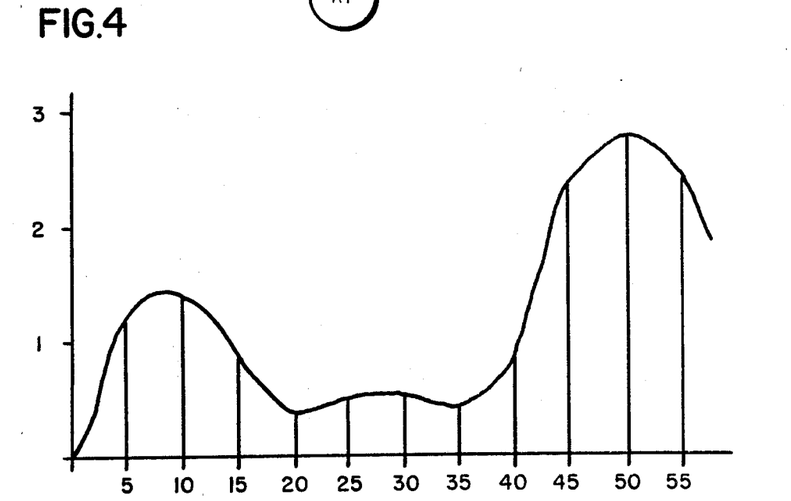
FIG. 4 is an exemplary diagram of a speed histogram of a motor vehicle.

Before proceeding to describe the portion of the program beginning with block 80, it is desirable to consider the vehicle speed histogram illustrated in FIG. 4. This histogram is a tabulation of the actual speed of the vehicle during a previous period, such as the previous ten minutes of driving. In the example shown, the vehicle drove at speeds of 5, 10 and 15 MPH for $1\frac{1}{4}$, $1\frac{1}{2}$ and 1 minute, respectively. The vehicle drove at 20, 25, 30 and 35 MPh for about $\frac{1}{2}$ minute each. Most of the vehicle travel time during the previous 15 minutes was spent at higher speeds, however, as the graph shows. The vehicle travelled 1 minute at 40 MPH, $2\frac{1}{2}$ minutes at 45 MPH, 3 minutes at 50 MPH and $2\frac{1}{2}$ minutes at 55 MPH.

The resulting "histogram" has three maxima, at 10, 30 and 50 MPH, respectively, and two minima, at 20 and 35 MPH, respectively. The presence and magnitude of these various maxima and minima can be used to determine the current "driving environment" of the motor vehicle.

Considering once more the portion of the program illustrated in FIG. 2, in block 80 the program updates the histogram (adds the current actual speed and deletes the oldest entry of speed) stored in memory. This updating funtion is therefore a "first in first out" amendment to the histogram so that the histogram always contains the most current speed data (data acquired during the last 10 minutes, for example). Thereafter, the program determines the maxima and minima in the histogram and sets the threshold speed TS equal to the highest minimum (e.g. 35 MPH in the example of FIG. 4).

The program then determines whether there is a maximum above 40 MPH. If so, it is assumed that the motor vehicle is operating on the open highway. If not, the program determines if the vehicle operator has manually set the switch 54 (FIG. 1) to city driving. If not, it is also assumed that the vehicle is operating on the open highway and the delay time DT is set equal to zero.

If the city driving switch has been manually set, or if the histogram has a maximum under 40 MPH and the actual, current vehicle speed S is under 40 (or some equivalent, medium speed), it is assumed that the vehicle is operating in a stop-and-go city environment. In this case the threshold delay time DT is set equal to about 1 minute (or such other time which is longer than the normal waiting period at a traffic light or in traffic). The program thus determines and "adapts" to the driving environment in which the motor vehicle finds itself.

Finally, the program at block 82 determines whether the parameter or parameters upon which the hazard warning decision is based have reached a condition or conditions, respectively, which warrant activation of the hazard warning system. If desired, these conditions may also be varied in accordance with the driving environment. For example, the program at this point may determine whether the actual, instantaneous speed S of the vehicle is less than the threshold speed TS. If not, the program returns again to enter; but if so, the program then determines at block 84 whether the timer variable T3 has exceeded the threshold delay time DT. If not, then T3 is incremented and the vehicle speed S is again compared to the threshold speed TS to make sure that it is still below this threshold. If so, then the program turns on the hazard warning system. The value TS may be made high or low, in dependence upon highway or city driving conditions, respectively.

Other examples of hazard warning decisions which may be included (either alternatively or collectively) in block 82 are:

(1) Comparison of the average measured speed of the vehicle with a prescribed threshold (the average being taken either over a short time, such as 10 seconds, to reduce the effects of noise, or a longer time, such as 1 minute, to actually determine the average speed of the vehicle over such time) with a prescribed threshold;

(2) Comparison of the instantaneous, actual speed of the vehicle with the time average speed thereof;

(3) Comparison of the speed difference between the given vehicle and a second motor vehicle which is approaching the given vehicle either from the front or from the rear, with a prescribed threshold; and/or (4) Comparison of the distance between the given vehicle and a second motor vehicle, which is either ahead or behind the given vehicle, with a prescribed threshold.

These methods of decision are set forth in detail in the above-mentioned U.S. patent application Ser. No. 07/083,042 now U.S. Pat. No. 4,807,10.

There has thus been shown and described a novel apparatus for automatically controlling the tail light of a motor vehicle which fulfills all the objects and advantages sought therefor. Many changes, modifications, variations and other uses and applications of the subject invention will, however, become apparrent to those skilled in the art after considering this specification and the accompanying drawings which disclose the preferred embodiments thereof. All such changes, modifications, variations and other uses and applications which do not depart from the spirit and scope of the invention are deemed to be covered by the invention which is limited only by the following claims.

What is claimed is:

1. In apparatus for automatically controlling a hazard warning system of a motor vehicle comprising control means for automatically actuating said hazard warning system in response to at least one condition indicting a hazard to other vehicles in the vicinity, said at least one condition of response including the fall of the speed of said vehicle below a prescribed speed threshold for a prescribed period of time, the improvement wherein said control means comprises means for sensing the driving environment of said motor vehicle and for changing said condition of response in dependence upon the sensed driving environment.

2. The improvement defined in claim 1, wherein said condition of response includes the the fall of the instantaneous speed of the vehicle below a prescribed threshold speed for a prescribed period of time.

3. The improvement defined in claim 1, wherein said condition of response includes the fall of the average speed of the vehicle below a prescribed threshold speed for a prescribed period of time.

4. The improvement defined in claim 2, wherein said changing means includes means for changing said threshold speed in dependence upon the driving environment.

5. The improvement defined in claim 2, wherein said changing means includes means for changing said period of time in dependence upon said driving environment.

6. The improvement defined in claim 3, wherein said changing means includes means for changing said threshold speed in dependence upon said driving environment.

7. The improvement defined in claim 3, wherein said changing means includes means for changing said period of time in dependence upon said driving environment.

8. The improvement defined in claim 1, wherein said condition of response includes the fall of the instantaneous speed of the vehicle below a prescribed threshold value from the time average speed of said vehicle for a prescribed period of time.

9. The improvement defined in claim 1, wherein said condition of response includes the increase of the speed difference between the own vehicle and a second motor vehicle that is approaching the own vehicle from one of the front and the rear thereof, while travelling in substantially in the same direction as the own vehicle, above a prescribed threshold.

10. The improvement defined in claim 1, wherein said condition of response includes the fall of the distance between the own vehicle and a second motor vehicle that is one of ahead and behind the own vehicle and travelling in substantially the same direction as the own vehicle, below a prescribed threshold.

11. The improvement defined in claim 1, wherein said sensed driving environment includes the recent speeds of said vehicle.

12. The improvement defined in claim 1, wherein said sensed driving environment includes the recent speed histogram of said vehicle.

13. The improvement defined in claim 1, wherein said sensed driving environment includes the recent brake actuations of said vehicle.

14. The improvement defined in claim 1, wherein said hazard warning system includes means for automatically transmitting a non-visible warning signal to other vehicles which are not within line of sight of said vehicle, and wherein said control means includes means for activating said transmitting means in response to said at least one condition indicating a hazard to other vehicles.

15. The improvement defined in claim 1, wherein said hazard warning system includes a tail light and switch means for selectively connecting said tail light with a source of voltage, wherein said control means includes means for closing said switch means, thereby connecting said tail light to said voltage source, in response to said hazard condition, and wherein said switch means includes means for periodically interrupting the circuit connecting said tail light to said voltage source when said switch means is in the closed position, thereby causing said tail light to flash.;

16. In apparatus for automatically controlling a hazard warning system of a motor vehicle comprising control means for automatically actuating said hazard warning system in response to at least one condition indicating a hazard to other vehicles in the vicinity, the improvement wherein said control means comprises means for sensing the driving environment of said motor vehicle and for changing the said condition of response in dependence upon the sensed driving environment, said means for sensing said driving environment including:
   (a) means for sensing the instantaneous speed of said vehicle;
   (b) means, responsive to said speed sensing means, for periodically storing a parameter which is dependent upon said instantaneous speed; and
   (c) means, coupled to said storage means, for changing said condition of response in dependence upon said stored parameter.

17. The improvement defined in claim 16, wherein said stored parameter is said instantaneous speed.

18. The improvement defined in claim 17, wherein said stored parameter comprises a group of said speeds which have been most recently stored.;

19. The improvement defined in claim 16, wherein said stored parameter comprises a histogram of the recent vehicle speed.

20. The improvement defined in claim 16, wherein said hazard warning system includes a tail light and switch means for selectively connecting said tail light with a source of voltage, wherein said control means includes means for closing said switch means, thereby connecting said tail light to said voltage source, in response to said hazard condition, and wherein said switch means includes means for periodically interrupting the circuit connecting said tail light to said voltage source when said switch means is in the closed position, thereby causing said tail light to flash.

* * * * *